United States Patent [19]

Garnier

[11] 4,354,785
[45] Oct. 19, 1982

[54] GAS-TIGHT CONNECTOR

[76] Inventor: Andre Garnier, Ferme de Bel-Air, Lueil-Sous-Faye, F-86200 Loudun, France

[21] Appl. No.: 145,815

[22] Filed: May 1, 1980

[51] Int. Cl.³ .............................................. B25J 1/00
[52] U.S. Cl. ...................................... 414/8; 403/327; 403/347; 414/729; 414/739
[58] Field of Search ......................... 414/8, 739, 753; 403/287, 288, 349, 325, 327; 414/729

[56] References Cited
U.S. PATENT DOCUMENTS
3,625,378 12/1971 Attiz ........................................ 414/8

Primary Examiner—John J. Love
Assistant Examiner—Douglas D. Watts
Attorney, Agent, or Firm—Young & Thompson

[57] ABSTRACT

A gas-tight connector, especially for the remote handling of radioactive or hazardous products by means of a master-slave manipulator. The connector is composed of a tong-unit connector element, a gas-tight connector element and a remote-manipulator connector element. The gas-tight element is engaged coaxially within the tong-unit element and the remote-manipulator element is engaged coaxially within the gas-tight element and also coupled to an articulated supporting arm. All three elements are traversed from one end to the other by shafts which are capable of translational motion in order to initiate opening and closing of the tong unit. The gas-tight element is provided with a sealing diaphragm which is capable of unfolding throughout each range of translational motion of the gas-tight element shaft while accompanying this latter and ensuring that a high standard of gas-tightness is maintained between the gas-tight element and the remote-manipulator element during all the forward and return movements of the shaft.

9 Claims, 9 Drawing Figures

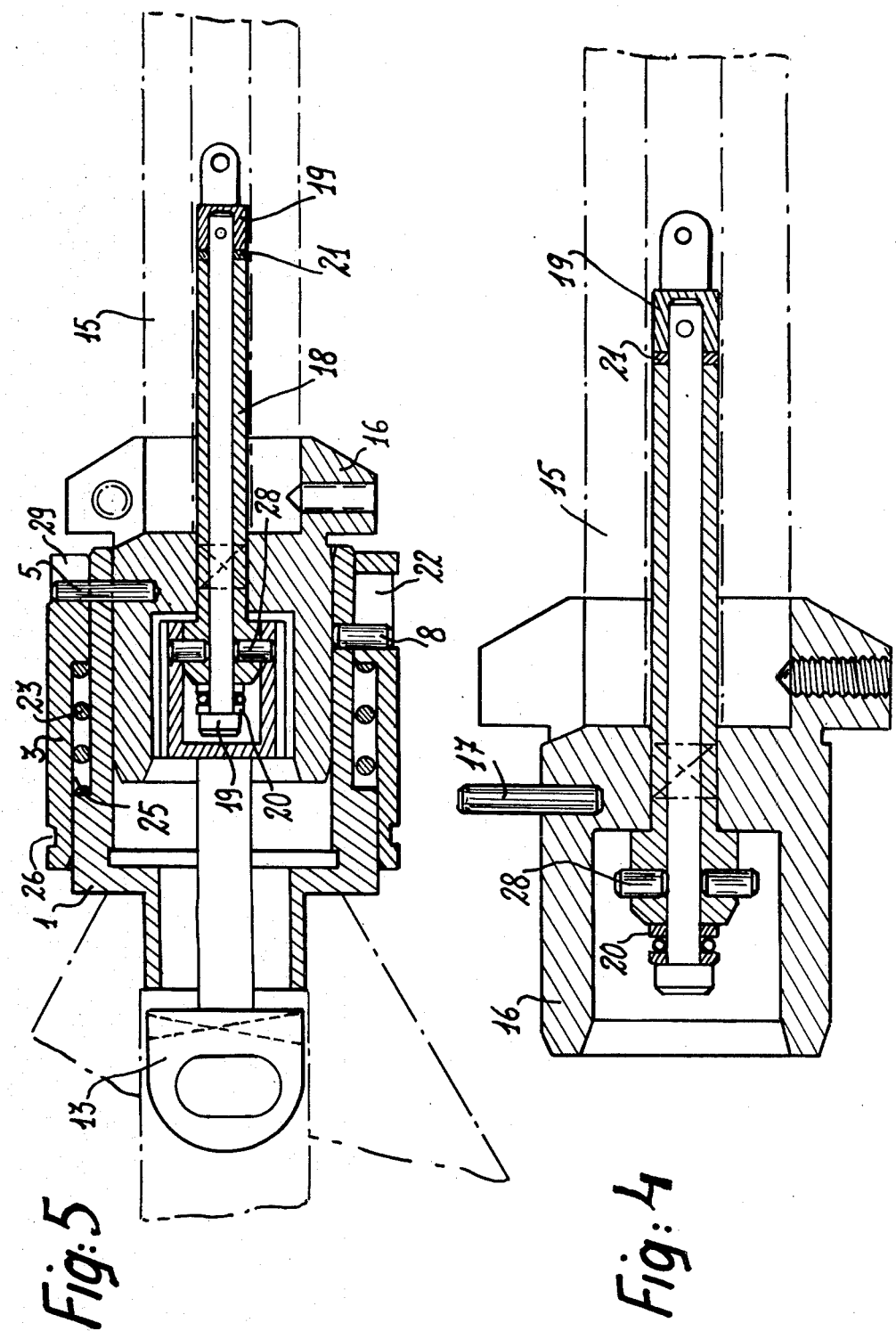

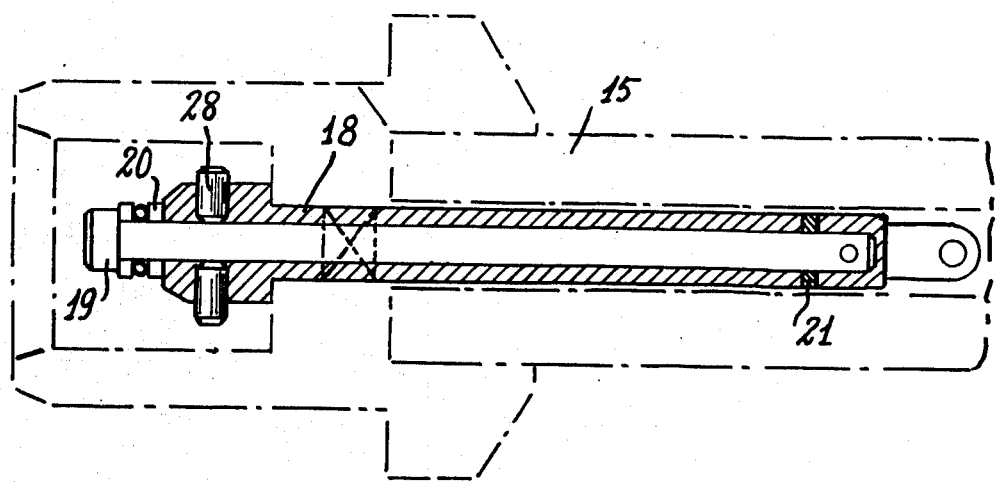
Fig:6
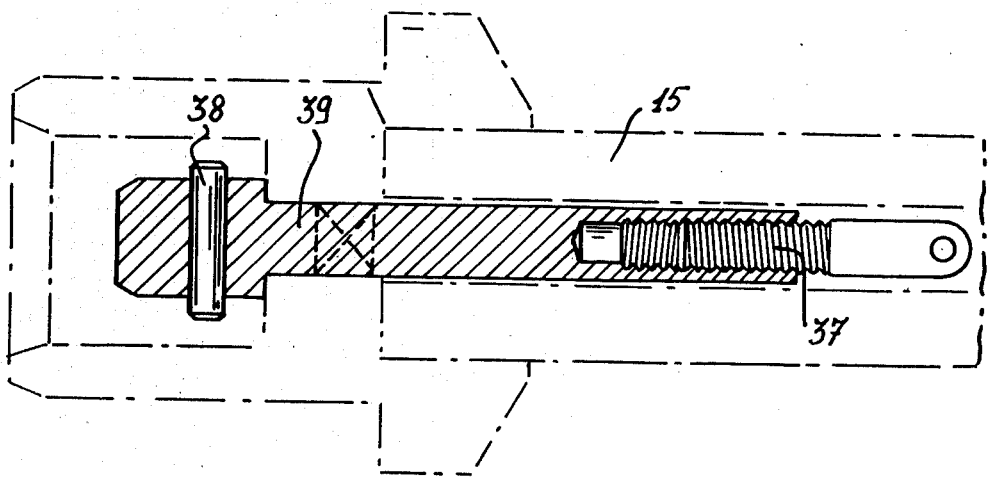
Fig:7

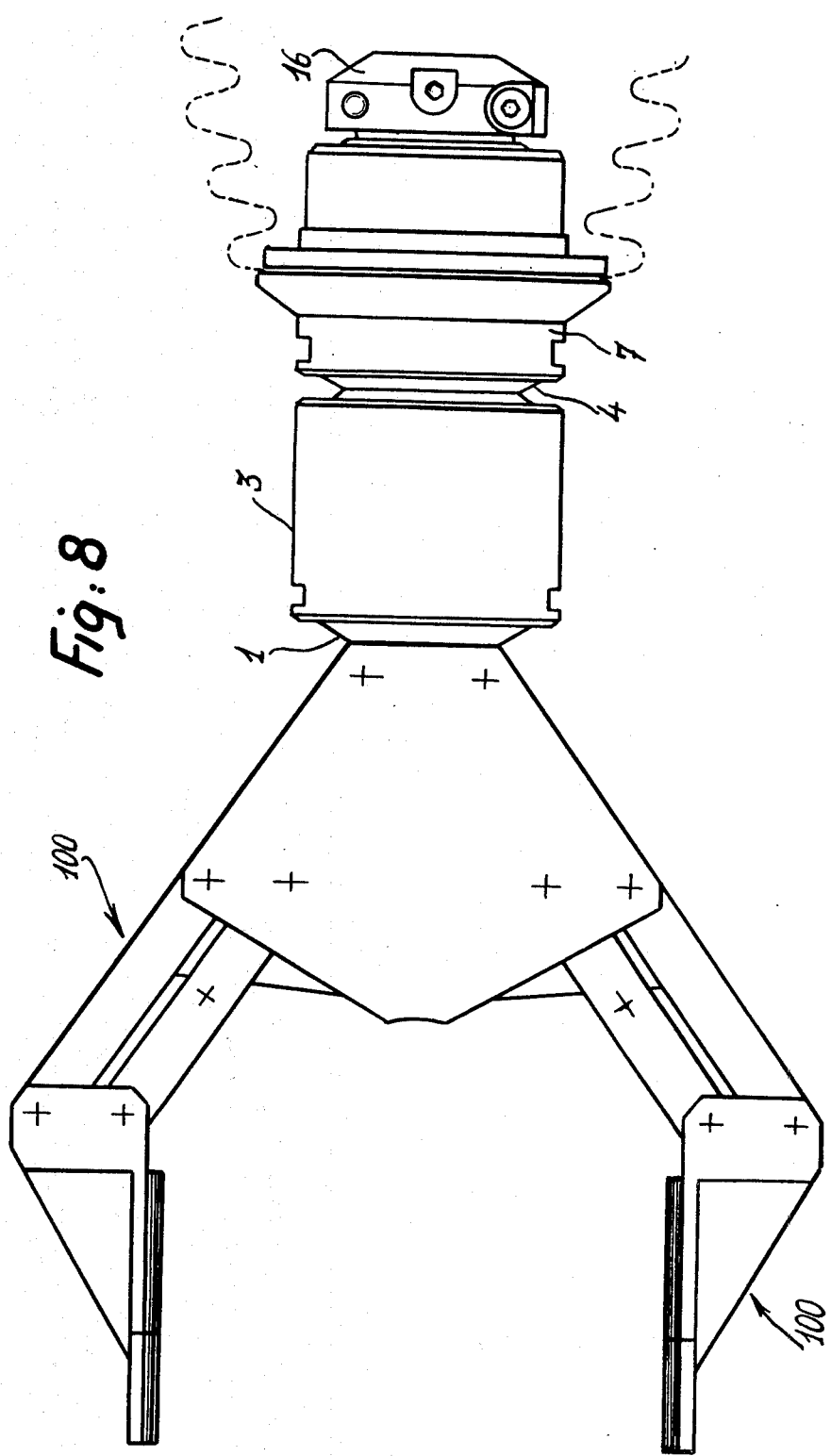

GAS-TIGHT CONNECTOR

This invention relates to a gas-tight connector composed of three elements and primarily but not exclusively intended for use within a gas-tight radiation-containment cave or shielded hot cell for the remote manipulation of objects or equipment which may be either radioactive or potentially hazardous.

Said connector can be adapted to any type of remote manipulator of the master-slave type and is mounted between the handling tong unit and the slave toggle-joint of the remote manipulator.

The essential aim of the connector is to ensure a high standard of gas-tightness between the interior of the hot cell (hot zone) and the operating zone (cold zone). Gas-tightness is ensured on the one hand within the interior of said connector by means of a diaphragm 11 and on the other hand by means of a sealing boot on the external portion of the connector.

Since the connector is designed for remote operation performed without any manual intervention, it is essential to ensure that the following operations can take place under perfect conditions of safety:

a. connection or disconnection of the tong unit;
b. connection or disconnection of the end-piece of the remote manipulator.

These essential requirements have led to the design of a gas-tight connector composed of three elements.

The connector of the present invention, intended to serve as a remote manipulator of the master-slave type intended primarily for remote handling of radioactive or hazardous products, comprises a first element designated as a "tong-unit connector" and comprising the tong unit proper, a second element designated as a "gas-tight connector" and a third element designated as a "remote-manipulator connector", the gas-tight connector being engaged coaxially within the tong-unit connector and the remote-manipulator connector being engaged coaxially within the gas-tight connector and also coupled to an articulated supporting arm, the three elements aforesaid being traversed from one end to the other by shafts which are capable of translational motion in order to initiate opening and closing of the tong unit, wherein the gas-tight connector is provided with a sealing diaphragm which is capable of unfolding through-out the range of translational motion of the shaft of the gas-tight connector while accompanying the displacement of said shaft and ensuring that perfect gas-tightness is maintained between said gas-tight connector and the remote-manipulator connector during all the forward and return movements of the shaft.

In one embodiment of the invention, said connector is equipped with a system for locking the gas-tight connector onto the tong-unit connector, said system being so arranged as to permit said locking action by applying the gas-tight connector axially against the tong-unit connector, followed by rotational displacement of said gas-tight connector about its axis, radial pins forming part of said gas-tight connector being then adapted to engage within bayonet sockets of said tong-unit connector and being locked automatically within said sockets by means of a component forming part of the second tong-unit connector.

In another embodiment of the connector of the present invention, the system for locking the gas-tight connector and the tong-unit connector comprises:

in the case of the tong-unit connector, two recesses formed radially in the body of said tong-unit connector, said recesses being in diametrically opposite relation and provided with extensions in the form of grooves located at right angles in said body, the combination of said recesses and grooves being such as to form the aforesaid bayonet sockets which are open in the direction of the intermediate gas-tight connector, as well as a ring slidably mounted on the body which constitutes the component aforesaid and is continuously urged towards the gas-tight connector by an elastic restoring member interposed between said ring and said body;

in the case of the gas-tight connector, the locking system additionally comprises two pins adapted to project radially from the body of said gas-tight connector and rigidly fixed to said body, said pins being located in diametrically opposite relation and adapted to engage within the recesses which form the bayonet sockets of the tong-unit connector as a result of axial thrust applied on the gas-tight connector, then to thrust back the sliding ring in opposition to the elastic force of the ring-restoring member, then to engage within the aforesaid grooves by rotation of said gas-tight connector, whereupon the sliding ring is automatically restored by its elastic member and locks said gas-tight connector onto said tong-unit connector, unlocking being permitted by reverse operations of sliding displacement of said ring followed by rotational and translational displacement of said gas-tight connector.

In a further embodiment of the connector, two diametrically opposite recesses are formed in the sliding ring for receiving the corresponding two pins rigidly fixed to the gas-tight connector at the time of elastic return of said sliding ring to the gas-tight connector, with the result that effective locking of said gas-tight connector to the tong-unit connector can thus be performed.

Non-limitative embodiments of the connector according to the invention are illustrated in the accompanying drawings listed below, in which:

FIG. 4 is a view of the remote-manipulator connector which forms part of the connector of FIG. 1;

FIG. 5 is a view of a connector in a second embodiment of the invention and formed by coupling of the first and third elements without gas-tight connection (second element);

FIG. 6 shows one possible system of coupling of the third element for a remote manipulator equipped with a cable or chain;

FIG. 7 is a view in elevation which is similar to FIG. 6 and shows a system of coupling of the third element for a remote manipulator equipped with a threaded end-piece;

FIG. 8 is a view in elevation showing particularly the tong unit; and

The gas-tight connector is shown in the accompanying drawings in the assembled state or in other words with the three aforementioned elements assembled together and in the tong closure position.

Figure 1:
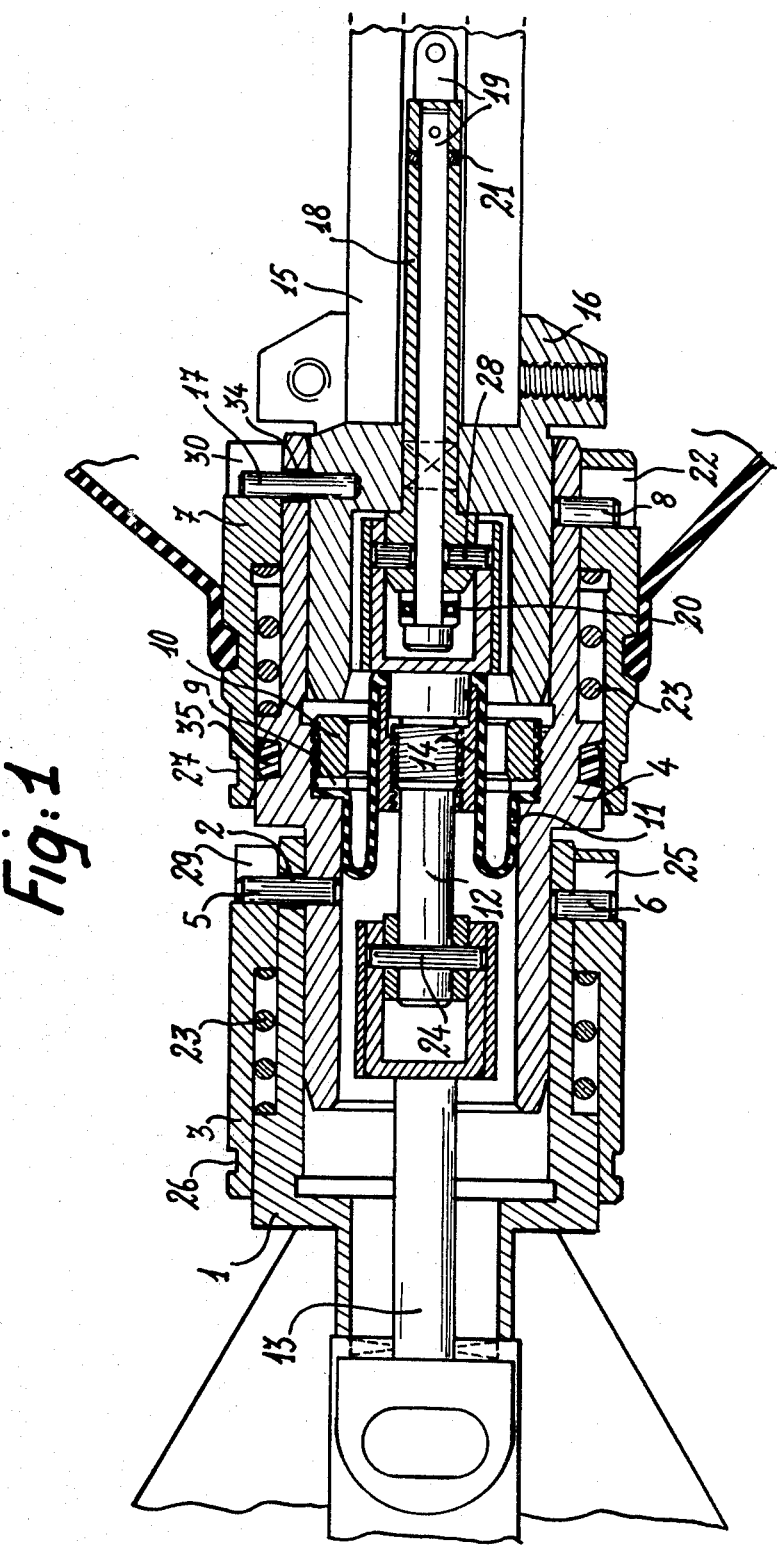
FIG. 1 is a general view of one embodiment of the connector according to the invention and shows the first, second and third connector elements assembled together.
Figure 2:
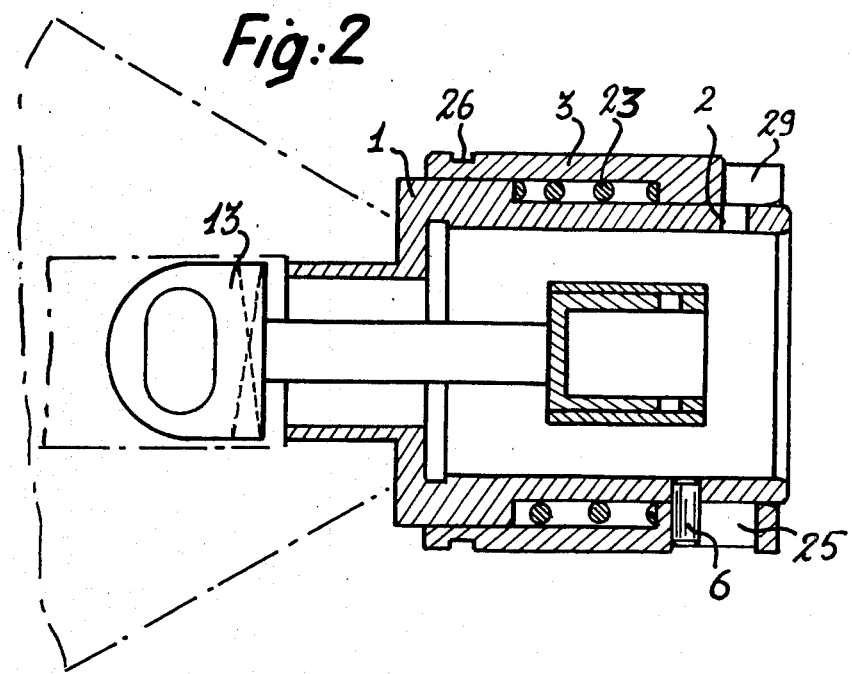
FIG. 2 is a view of the tong-unit connector of the connector shown in FIG. 1.
Figure 3:
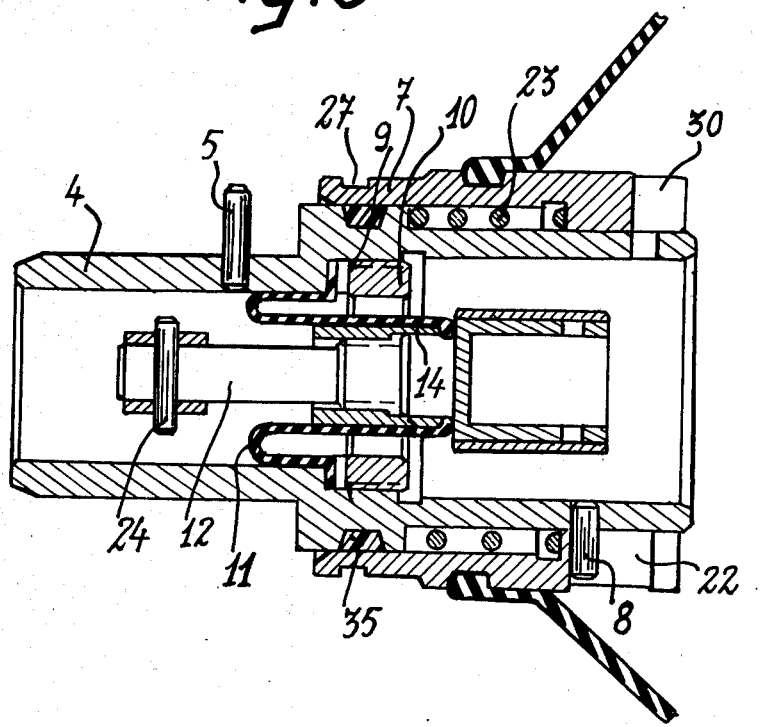
FIG. 3 is a view of the gas-tight connector which forms part of the connector of FIG. 1.

As shown in FIG. 1, said connector is made up of three separate portions:

First element: tong-unit connector
Second element: gas-tight connector
Third element: remote-manipulator connector.

A. FIRST ELEMENT: TONG-UNIT CONNECTOR

This connector is mounted directly on the tong unit and is composed of two essential elements:

(1) A body 1 comprising a centering sleeve for coupling with the tong unit and two bayonet-type locking devices 2 as well as two pins of the safety release system 6.

(2) A sliding ring 3 for obtaining at will either the position of locking or the position of unlocking of the second and third elements of the connector.

The movement of translation of the ring 3 on the body 1 makes it possible to obtain the desired position in either of the two cases mentioned below. Remote control of this movement will be explained in the description relating to the mode of operation.

N.B.: Said first element may be integral with the tong unit if necessary.

B. SECOND ELEMENT: GAS-TIGHT CONNECTOR

This connector is the main component of the device since it ensures gas-tightness (see paragraph relating to "General description").

Said connector is composed of three essential elements:

(1) A body 4 made up of several portions:

a. a centering sleeve for mounting the tong-unit connector (first element) and two pins 5 for locking the two bayonet couplings which are positioned in the body 1.

b. a centering sleeve for receiving the retractable ring 7; said ring is fitted with a seal 35 for ensuring gas-tightness. Said seal can be replaced by a diaphragm which would be joined to the retractable ring 7.

c. a centering sleeve which, as mentioned in the foregoing, is also adapted to receive the sliding ring 7 which is provided with the two bayonet couplings 34 and the two pins 8 of the safety release system. At the bottom of said centering sleeve are placed a washer 9 and a nut 10 for locking the diaphragm 11 in position. This mode of attachment is mentioned solely by way of general principle and not in any limiting sense.

(2) A retractable ring 7 makes it possible to obtain at will either locking or unlocking of the third element with respect to the second element.

The movement of translation on the body 4 makes it possible to obtain the desired position in either of the two cases mentioned above. Remote control of this movement will be explained in the description relating to the mode of operation.

Two grooves are formed in said retractable ring for receiving the boot (single or double) in order to ensure gas-tightness with respect to the exterior.

(3) A transmission shaft serves to provide a coupling between the tong-actuating shaft 13 and the shaft 12 of the second element, the coupling being effected by means of a bayonet system. The diaphragm 11 is fixed on said shaft by means of a nut 14 and unfolds during the movement of translation of the shaft 12.

C. THIRD ELEMENT: REMOTE-MANIPULATOR CONNECTOR

This connector is mounted directly on the end-piece 15 of the differential system of the remote manipulator and has two essential components:

(1) A body 16 which makes it possible to couple said third element on the one hand with the end-piece 15 of the remote manipulator and on the other hand with the second element (gas-tight connector); said body 16 is fitted with the two pins 17 for locking the two bayonet couplings which are positioned within the body 4.

(2) A transmission shaft 18 which provides a connection between the operating shaft of the second element (gas-tight connector) and the attachment means (cable or chain of the remote manipulator).

The shaft aforementioned is provided with two coupling systems:

a. At the end corresponding to connection with the shaft 12 of the second element: a shaft 18 with a bayonet coupling system;

b. At the end corresponding to connection of the remote manipulator (tong closure): a shaft 19 with riveted assembly for transmission by chain or by inserted end-piece for a cable.

The transmission shaft has been specially designed to take into account the different movements of rotation of the tong unit, that is, in order to permit rotation of said unit from one to a number of revolutions. For this reason, it has proved necessary and in particular in the case of a tong closure movement performed by chain transmission (this latter being of a rigid design) to provide a device as contemplated in the general arrangement drawing of FIG. 1. It will be noted in this figure that the transmission shaft 12 for providing a coupling between the operating shaft of the second element (gas-tight connector) and the shaft 18, 19 for providing a coupling with the remote-manipulator control means (cable or chain) have been designed so as to form two components.

a. Translational motion of the first component 18 is guided by a square operating nut. This ensures on the one hand accurate position-location of the shaft 18 of the third element and makes it possible on the other hand, in the event of failure of the attachment means for transmitting the tong-closure movement of the remote manipulator, to carry out remote disconnection of the first and second elements in order that the remote manipulator may thus be withdrawn without any impairment of gas-tightness. The third element which is mounted directly on the end-piece 15 of the differential system therefore forms an integral part of the remote manipulator, thus permitting disconnection of the first and second elements as a result of rotational motion.

b. The second component 19 is the shaft which serves to connect the tong-closure control means of the remote manipulator (cable or chain). Said shaft 19 is mounted within the shaft 18, the translational displacement of which is guided by means of a square operating nut. Said shaft 19 is capable of unlimited rotational motion, with the result that the connector which forms the subject of this description is also capable of unlimited rotation.

In order to prevent friction forces at the moment of a handling operation involving the combination of two simultaneous movements, namely the movement of closure and rotation of the tongs, a ball thrust bearing 20 and a friction washer 21 have been provided on the aforementioned shaft 19 which has the design function of transmitting the tong closure movement.

N.B.: The description given in the above paragraph b) is intended to convey only a general principle. In certain existing types of remote manipulators, provision is made for another adaptation as shown in FIG. 7, but this does not in any way exclude the possibility of utilization of the device in accordance with the general description.

In FIG. 7, the components 28-18-19 and 21 are modified, thus making it necessary to suppress the components 20-21 and 19 which are replaced by the components 37-38 and 39.

As will readily be understood, the invention is not limited in any sense to the embodiments which have been described with reference to the accompanying drawings and which have been given solely by way of example.

It is important to note that the first element can be mounted on the third element without any modification. In other words, since the second element does not serve any useful purpose in the case of cells mounted without any sealing device, the same components may be employed for the sake of standardization.

In conclusion, the present invention relates to a gas-tight connector which can be adapted to any type of remote manipulator, which has the advantage of ensuring a high standard of gas-tightness, and which permits remote connection or disconnection.

It is also possible to dispense with the use of the second element (gas-tight connector) and either to connect or to disconnect the first and second elements in the case of utilization of remote manipulators mounted within handling cells in which gas-tightness is not an essential requirement.

PRINCIPLE OF USE

In all cases, the tong unit on which the first element is mounted is placed within a so-called "Assembly/-disassembly" apparatus fixed within the interior of the handling cell (hot side).

Three cases of assembly or disassembly of this connector can arise:
a. Introduction of the remote manipulator within the cell;
b. Withdrawal of the remote manipulator from said cell;
c. Assembly or disassembly of the tong unit equipped with the first element together with the end-piece of the remote manipulator (third element) without any gas-tight connector (second element).

A. INTRODUCTION

Figure 9:
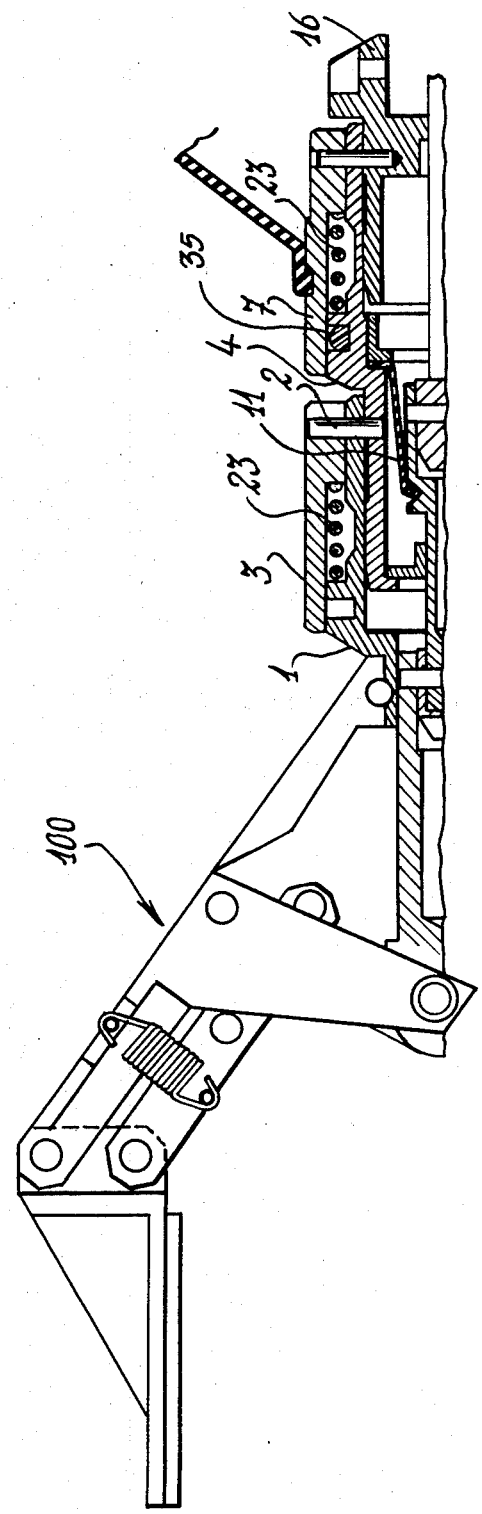
FIG. 9 is a fragmentary cross-sectional view of the structure shown in FIG. 8.

As mentioned in the foregoing, the tong unit 100, shown in FIGS. 8 and 9 and which can be entirely conventional, and which is equipped with the first elements is mounted within an apparatus which will permit the connection of this device.

The second element mounted on the sealing boot has previously been introduced into the cell and positioned within an apparatus which will permit the connection of said element with the third element, this latter being rigidly fixed to the remote manipulator.

The slave arm of the remote manipulator which is adapted to carry the third element of said device is passed through the wall penetrating into the sealing boot.

(1) Assembly of the second and third elements

Since the body 4 and the shaft 12 are stationarily fixed within the assembly apparatus, the third element is introduced into the body 4 with the aid of a visual reference mark cut in the sliding ring 7. A movement of thrust is exerted on the pins 17 and 28 when these latter are located opposite to the bayonet sockets. The sliding ring 7 which is guided in its lateral displacement by means of a slot 22 moves downwards and releases the bayonet coupling from the body 4, thereby locking the bayonet systems of the components 4 and 12 by means of a movement of rotation (through an angle of 45° in the clockwise direction) controlled by the operator on the cold side by means of the master control handle. The sliding ring is displaced under the action of the spring 23 and accordingly locks the bayonet system of the body 4 by means of a recess 30 and two pins 17 which are rigidly fixed to the body 16. As mentioned in the general description, safety of unlocking of the pin 17 is ensured by virtue of the design concept of said pin. Assembly of the second and third elements is then complete.

(2) Assembly of the first element with the tong unit

As mentioned earlier, the first element equipped with its tong unit 100 is mounted within an apparatus which will make it possible to establish a connection with the elements 2 and 3 and the mode of assembly of which has been described in the foregoing.

The movements which are necessary in order to assemble this new element are identical with those performed for the assembly of the elements 2 and 3, namely:

The body equipped with its tong unit 1 is stationarily fixed within the assembly apparatus. Since the shaft 13 is stationarily fixed within the tong-unit body, the end-piece of the second element is introduced into the body 1 with the aid of a visual reference mark cut in the sliding ring 3. A movement of thrust is then exerted on the pins 5 and 24 which are located opposite to the bayonet sockets. The sliding ring 3 which is guided in its lateral displacement by means of a slot 25 moves downwards and releases the bayonet coupling from the body 1. Thus the bayonet systems of the components 13 and 1 can be locked by means of a movement of rotation (through an angle of 45° in the clockwise direction) produced by the operator on the cold side by means of the control handle. The sliding ring which is acted upon by the spring 23 undergoes a displacement and accordingly locks the bayonet system of the body 1 by means of a recess 29 located in the ring and by means of the two pins 5 which are rigidly fixed to the body 4.

Safety is thus ensured in regard to unlocking of the tong unit by virtue of the fact that the tong-unit control shaft 13 is secured against rotation.

The assembly of the three elements which constitute said connector is then complete.

B. WITHDRAWAL

In order to withdraw the remote manipulator, the operation is performed in reverse, that is, as follows:
a. The tong unit equipped with the first element is disconnected;

b. The remote-manipulator connector (third element) is disconnected from the gas-tight connector (second element).

(1) Disconnection of tong unit and first element

This unit is introduced into the assembly and disassembly apparatus while taking care to engage the rack coupling 26 provided on the sliding ring 3, whereupon a tractive effort is exerted by means of the remote manipulator. The sliding ring 3 which is locked in position within the rack coupling will make it possible to free the recess 29 which is located in said sliding ring. The pins 5 are therefore released. By means of the control handle, the operator then performs a movement of rotation on the cold side (through an angle of 45° in the anticlockwise direction) in order to disconnect the pins 5 and 24 of the two bayonet systems. Under the action of the spring 23, the assembly of the second and third elements is accordingly released and in a position of readiness for another connecting operation.

(2) Disconnection of the remote-manipulator connector (third element) and of the gas-tight connector (second element)

This unit is introduced into the assembly and disassembly apparatus while taking care to engage the rack coupling 27 provided on the sliding ring 7, whereupon a tractive effort is exerted by means of the remote manipulator. The sliding ring 7 which is located in position within the rack coupling will make it possible to free the recess 30 which is located in said sliding ring 7; the pins 17 and 28 are therefore released. By means of the control handle, the operator carries out a movement of rotation on the cold side (through an angle of 45° in the anticlockwise direction) in order to disconnect the pins 17 and 28 of the two bayonet systems. Under the action of the spring 23, the assembly constituted by the remote-manipulator connector (third element) coupled to the gas-tight connector (second element) is accordingly released and in a position of readiness for another connecting operation.

C. ASSEMBLY OR DISASSEMBLY OF THE TONG UNIT EQUIPPED WITH THE FIRST ELEMENT, WITH RESPECT TO THE END-PIECE OF THE REMOTE MANIPULATOR (THIRD ELEMENT), WITHOUT GAS-TIGHT CONNECTOR (SECOND ELEMENT)

See FIG. 5.

In this case of utilization, assembly or disassembly is similar to the operation described in the foregoing; non-utilization of the gas-tight connector (second element) does not modify the mode of operation.

What is claimed is:

1. A connector for a remote manipulator of the master-slave type intended primarily for remote handling of radioactive or hazardous products, comprising a first element designated as a "tong-unit connector" and comprising the tong unit proper, a second element designated as a "gas-tight connector" and a third element designated as a "remote-manipulator connector", the gas-tight connector being engaged coaxially within the tong-unit connector and the remote-manipulator connector being engaged coaxially within the gas-tight connector, the three elements aforesaid being traversed from one end to the other by shafts which are capable of translational motion in order to initiate opening and closing of the tong unit, wherein the gas-tight connector is provided with a sealing diaphragm which is capable of unfolding throughout the range of translational motion of a shaft of the gas-tight connector while accompanying the displacement of said shaft and ensuring that perfect gas-tightness is maintained between said gas-tight connector and the remote-manipulator connector during all the forward and return movements of the shaft, said connector including a system for locking the gas-tight connector onto the tong-unit connector, said system being so arranged as to permit said locking action by applying the gas-tight connector axially against the tong-unit connector, followed by rotational displacement of said gas-tight connector about its axis, radial pins forming part of said gas-tight connector being then adapted to engage within bayonet sockets of said tong-unit connector and being locked automatically within said sockets by means of a component forming part of the second tong-unit connector.

2. A connector according to claim 1, wherein the system for locking the gas-tight connector and the tong-unit connector comprises:

in the case of the tong-unit connector, two recesses formed radially in the body of said tong-unit connector, said recesses being in diametrically opposite relation and provided with extensions in the form of grooves located at right angles in said body, the combination of said recesses and grooves being such as to form the aforesaid bayonet sockets which are open in the direction of the intermediate gas-tight connector, as well as a ring slidably mounted on the body which constitutes the component aforesaid and is continuously urged towards the gas-tight connector by an elastic restoring member interposed between said ring and said body;

in the case of the gas-tight connector, the locking system additionally comprises two pins adapted to project radially from the body of said gas-tight connector and rigidly fixed to said body, said pins being located in diametrically opposite relation and adapted to engage within the recesses which form the bayonet sockets of the tong-unit connector as a result of axial thrust applied on the gas-tight connector, then to thrust back the sliding ring in opposition to the elastic force of the ring-restoring member, then to engage within the aforesaid grooves by rotation of said gas-tight connector, whereupon the sliding ring is automatically restored by its elastic member and locks said gas-tight connector onto said tong-unit connector, unlocking being permitted by reverse operations of sliding displacement of said ring followed by rotational and translational displacement of said gas-tight connector.

3. A connector according to claim 2, wherein two diametrically opposite recesses are formed in the sliding ring for receiving the corresponding two pins rigidly fixed to the gas-tight connector at the time of elastic return of said sliding ring to the gas-tight connector, with the result that effective locking of said gas-tight connector to the tong-unit connector can thus be performed.

4. A connector according to claim 1, wherein the gas-tight connector and the remote-manipulator connector are equipped with a system for locking said two connectors to each other by means of an axial thrust applied by the remote-manipulator connector against the gas-tight connector followed by rotation of said remote-manipulator connector about its axis, pins arranged radially on the remote-manipulator connector being then adapted to engage within bayonet sockets of the gas-tight connector and being automatically locked within said sockets by means of a member forming part of said gas-tight connector.

5. A connector according to claim 4, wherein the system for locking the remote-manipulator connector to the gas-tight connector comprises:

in the case of the gas-tight connector, two recesses formed radially in the body of said gas-tight connector, said recesses being in diametrically opposite relation and provided with extensions in the form of grooves located at right angles in said body, the combination of said recesses and grooves being such as to form the aforesaid bayonet sockets which are open in the direction of the remote-manipulator connector, as well as a ring slidably mounted on the body which constitutes the component aforesaid and is continuously urged towards the remote-manipulator connector by an elastic member interposed between said ring and said body, means being further provided for locking said ring rotationally with respect to the body of the gas-tight connector;

in the case of the remote-manipulator connector, the locking system additionally comprises two pins adapted to project radially from the body of said remote-manipulator connector and rigidly fixed to said body, said pins being located in diametrically opposite relation and adapted to engage within the recesses which form the bayonet sockets of the gas-tight connector as a result of axial thrust applied on the remote-manipulator connector, then to thrust back the sliding ring in opposition to the elastic force of the ring-restoring member, then to engage within the aforesaid grooves by rotation of said remote-manipulator connector, whereupon the sliding ring is automatically restored by its elastic member and locks said remote-manipulator connector to said gas-tight connector, unlocking being permitted by means of the reverse operations of axial displacement of said sliding ring followed by rotational and translational displacement of said remote-manipulator connector.

6. A connector according to claim 5, wherein the sliding ring of the gas-tight connector is provided with two diametrically opposite recesses for receiving the corresponding two pins of the remote-manipulator connector in order to lock said remote-manipulator connector in position at the time of elastic return of said ring to its initial position.

7. A connector according to claim 2, wherein means are provided for securing the two sliding locking-rings against rotation with respect to the bodies on which they are mounted, said means being constituted for example by lugs rigidly fixed to said bodies and engaged in slots formed in the rings in a direction parallel to the axis of said connector.

8. A connector according to claim 1, wherein the sealing diaphragm of the intermediate gas-tight connector has a configuration in the form of an elongated cap or substantially in the shape of a cone frustum such that the small-diameter extremity is attached to the shaft whilst the periphery of its large-diameter extremity is inserted between the body of the gas-tight connector and a ring screwed within said body, said diaphragm being thus capable of unfolding or unwinding around the shaft throughout each range of travel of said shaft while maintaining the full degree of requisite gas-tightness between that portion of the gas-tight connector which is located at the end nearest the tong-unit connector and the other portion located at the end nearest the remote-manipulator connector.

9. A connector according to claim 1, wherein said elements comprise means for disconnecting said tong-unit and said first elements and means for disconnecting the third element of the second element while maintaining gas-tightness between said second and third elements.

* * * * *